United States Patent [19]

Tanaka et al.

[11] Patent Number: 4,831,895
[45] Date of Patent: May 23, 1989

[54] STARTING MOTOR

[75] Inventors: Toshinori Tanaka; Isao Hamano, both of Himeji, Japan

[73] Assignee: Mitsubishi Denki Kabushiki Kaisha, Japan

[21] Appl. No.: 435,118

[22] Filed: Oct. 19, 1982

[30] Foreign Application Priority Data

Nov. 7, 1981 [JP] Japan ............................. 56-166090

[51] Int. Cl.$^4$ ............................................. F16H 57/10
[52] U.S. Cl. .................................. 74/785; 192/107 R; 411/163
[58] Field of Search ................. 74/785, 7 E, 788, 801; 411/160, 161, 162, 163, 531, 544, 545; 464/30, 45, 46, 47, 48; 188/71.1, 73.2, 83, 196 P, 218 X L, 192, 107 R; 192/107 R, 70.14

[56] References Cited

U.S. PATENT DOCUMENTS

| 1,279,686 | 9/1918 | Hale | 411/163 |
| 1,715,883 | 8/1929 | Adams | 411/160 |
| 2,514,051 | 7/1950 | Gredell | 464/45 |
| 2,756,795 | 7/1956 | Clingman | 411/160 |
| 3,124,370 | 3/1964 | Traugott | 411/531 |
| 3,209,603 | 10/1962 | Rodriguez | 74/7 |
| 3,788,151 | 1/1974 | Campau | 74/7 |
| 4,156,817 | 5/1979 | Preece et al. | 290/38 R |

FOREIGN PATENT DOCUMENTS

| 2611078 | 9/1977 | Fed. Rep. of Germany ... 188/218 X L |
| 193064 | 2/1923 | United Kingdom ............ 192/107 R |

Primary Examiner—Dwight G. Diehl
Attorney, Agent, or Firm—Leydig, Voit & Mayer

[57] ABSTRACT

In a starting motor which has reduction gears including a planet gear and in which at least one end part of an internal gear of the reduction gears is fastened in engagement with an elastic member so as to hold the internal gear within a housing in sandwiched fashion; the improvement comprising the fact that the surface of the annular elastic member abutting on the internal gear is uneven.

2 Claims, 2 Drawing Sheets

STARTING MOTOR

BACKGROUND OF THE INVENTION

This invention relates to a starting motor, and more particularly to improvements in the buffer of a starting motor equipped with planetary reduction gears.

A prior-art device of the specified type has been as shown in FIGS. 1 and 2. Referring to the figures, numeral 1 designates a D.C. motor, and numeral 2 an armature, which has a rotary shaft 3. An output end part of the rotary shaft 3 is formed with a spur gear 4, with which a planetary gear 5 meshes. Shown at numeral 6 is an internal gear which touches internally, and meshes with, the planetary gear 5. The internal gear 6 is snugly fitted in a socket portion 8 of a front bracket 7 along with an intermediate bracket 9 as well as an elastic member 10, and owing to the installation of the D.C. motor 1, they are fastened in pressed engagement by the abutting force of a yoke 11 of the D.C. motor. Numeral 12 indicates a bearing which is snugly fitted on the inner peripheral surface of the planetary gear 5, and which is carried by a supporting pin 13. Shown at numeral 14 is a flange portion which carries the supporting pin 13 by snugly inserting it therein. A rotary output shaft 15 is unitarily fastened on one side of the flange portion 14, and the rotational speed of the rotary shaft 3 of the armature is reduced and transmitted to this rotary output shaft. Numeral 16 indicates a helical spline which is formed in the outer peripheral surface of the rotary output shaft 15, and which is held in spline engagement with a clutch-outer 18 of an overrunning clutch 17. Numeral 19 designates a roller, numeral 20 a clutch-inner, and numeral 21 a pinion which is fastened to the clutch-inner. Numeral 22 denotes a sleeve bearing which is fitted on the inner peripheral surface of the clutch-inner 20 as well as the pinion 21, and which is loosely fitted so as to swing on the rotary shaft 15. Numeral 23 denotes a washer, and numeral 24 a clutch cover which unitarily fastens the various constituent members. Shown at numeral 25 is a washer which is loosely fitted in a recess 26 provided in the outer peripheral surface of the rear part of the clutch-outer 18, and which forms an engagement portion for a shift lever 27. Numeral 28 indicates a stopper, and numeral 29 a ring which fastens this stopper in engagement with a groove 30 of the rotary shaft 15.

The operation of the device having the above construction will now be described. The shift lever 27 is made to move by an electromagnetic switch, not shown. Thus the overrunning clutch 17 is shifted forward on the rotary output shaft 15 until the pinion 21 comes into mesh with a ring gear of an engine, not shown. Subsequently, the D.C. motor 1 is energized, so that the armature 2 generates a turning force. This turning force is transmitted to the armature rotary shaft 3, with the result that the planetary gear 5 is made to rotate through the spur gear 4. The planet any gear 5 performs a planetary motion due to its simultaneous mesh with the internal gear 6. The resultant turning force is transmitted to the flange 14 through the supporting pin 13, and this turning force is transmitted to the ring gear (not shown) of the internal combustion engine through the rotary output shaft 15, helical spline 16, clutch-outer 18, roller 19, clutch-inner 20 and pinion 21, so that the internal combustion engine is started. In addition, when the planetary gear 5 is made to rotate, a reaction against its turning force develops in the internal gear 6, and the turning force is resiliently opposed by the reactive thrust of the elastic member 10. Accordingly, the impace force developing in the planetary reduction gears is absorbed by the action of the elastic member 10, which acts as a buffer.

With the prior art device, however, the elastic member 10 has a plane surface which abuts on the end face of the internal gear 6, and hence, the deformation of the elastic member 10 is not sufficient. This leads to the disadvantages of an unsatisfactory resilient effect, etc.

SUMMARY OF THE INVENTION

The present invention ameliorates the disadvantages of the prior art device described above, and provides a novel structure in which the portion of an elastic member to frictionally abut an internal gear is corrugated.

BRIEF DESCRIPTION OF THE DRAWINGS

In the drawings, the same symbols indicate the same or corresponding parts.

DESCRIPTION OF THE PREFERRED EMBODIMENT

Figure 3:
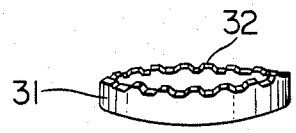
FIG. 3 is a perspective view showing an embodiment of this invention.

An embodiment of this invention will now be described with reference to FIG. 3. In the figure, numeral 31 designates an annular elastic member which is made of a material similar to that of the foregoing elastic member 10 and which is installed in the same place and has the function of thrusting the foregoing internal gear 6 into frictional engagement therewith. The elastic member 31, however, is formed with a corrugated surface providing a protruding axially extending portions 32 in its surface abutting the internal gear 6. The other surfaces of the elastic member 31 are the same as in the prior art device.

Figure 1:
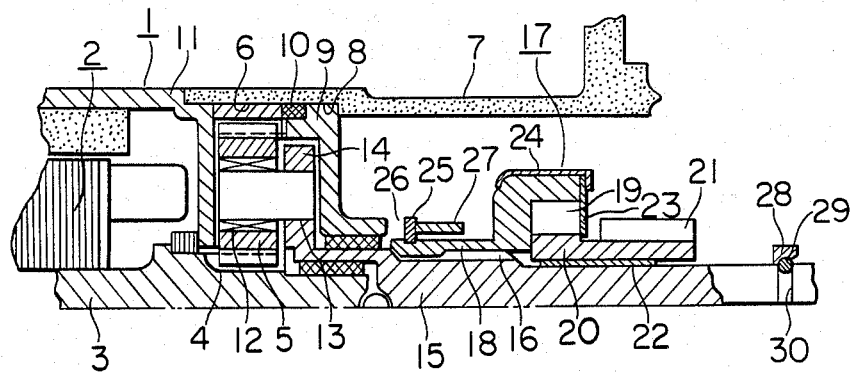
FIG. 1 is a sectional view showing a prior art starting motor.
Figure 2:
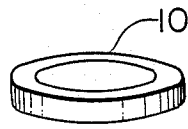
FIG. 2 is a perspective view showing one constituent component of the prior art starting motor.
Figure 4:
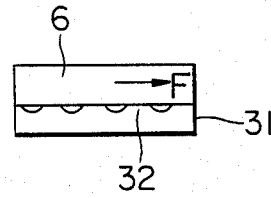
FIGS. 4 and 5 are digrammatic illustrations for explaining the invention.
Figure 5:
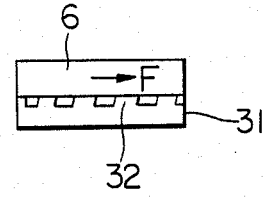
Figure 6:
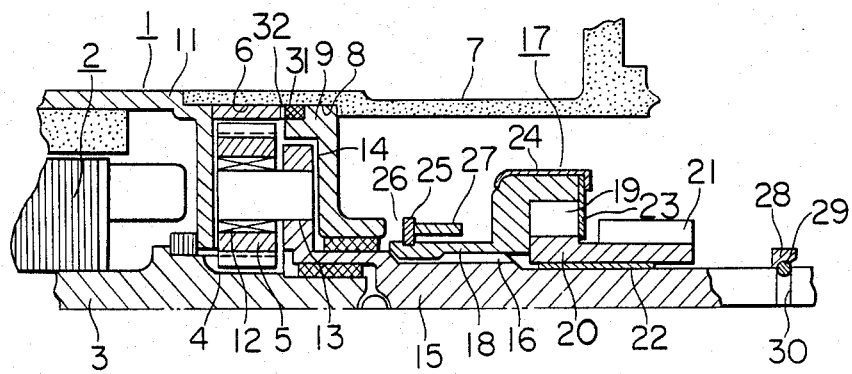
FIG. 6 is an enlarged sectional view similar to FIG. 1 incorporating an elastic member according to the invention.

The function of the above construction will now be described with reference to FIGS. 4 and 5. The internal gear 6 is rotated from a position shown in FIG. 4 in the illustrated direction (F) by the action of the planetary gear 5 shown in FIG. 1. Then, as shown in FIG. 5, the protruding axially extending portions 32 of the elastic member 31 flex and incline circumferentially, i.e., rightward as viewed in the figure under turning force from the gear 6 and exert reactive thrust on the internal gear 6 elastically, so that the frictional force at the abutting surfaces of the protruding portions holds the internal gear in resilient engagement with the elastic member. With this corrugated surface of the elastic member 31, the reactive thrust effect of the elastic member is very easy to achieve and the elastic force of the protruding portions 32 is easily applied to the internal gear 6.

In this case, when urethane rubber is used as the material of the elastic member 31, energy absorbtion is great, the wear resistance is excellent and a high degree of reliability is attained.

As set forth above, according to this invention, the resilient effect can be sharply enhanced by a simple construction wherein a large number of protruding axially extending portions are formed on the surface of an elastic member abutting on an internal gear, the elastic member holding the internal gear resiliently and fastening it in engagement therewith within a housing in sandwiched fashion. This achieves the effect that a buffer having a high reliability is inexpensively obtained.

What is claimed is:

1. In a starting motor having a housing, planetary reduction gears including an internal gear in said housing, the improvement comprising an elastic member having a first annular portion mounted in engagement with a fixed annular member of said housing and a plurality of protruding axially extending elastic portions providing a corrugated surface pressed into engagement with an end portion of said internal gear, said elastic member being sandwiched between said internal gear and said housing member, said plurality of protruding axially extending elastic portions providing resilient means which flex and incline circumferentially under turning force from said internal gear and exert reactive thrust on the internal gear elastically so that the frictional force at the abutting surfaces of the protruding portions holds the internal gear in resilient engagement with the elastic member and the resilient means acts as a buffer to absorb rotary impact force developing in the planetary reduction gears.

2. A starting motor according to claim 1, wherein said elastic member is made of urethane rubber.

* * * * *